United States Patent
Yen

(10) Patent No.: US 10,203,913 B2
(45) Date of Patent: Feb. 12, 2019

(54) METHOD OF DETERMINING A PHYSICAL LOCATION OF A HARD DRIVE IN A CLUSTER STORAGE SYSTEM

(71) Applicant: Mitac Computing Technology Corporation, Taoyuan (TW)

(72) Inventor: Chi-Yuan Yen, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 337 days.

(21) Appl. No.: 15/346,200

(22) Filed: Nov. 8, 2016

(65) Prior Publication Data

US 2017/0185355 A1 Jun. 29, 2017

(30) Foreign Application Priority Data

Dec. 23, 2015 (TW) .............................. 104143423 A

(51) Int. Cl.
*G06F 12/00* (2006.01)
*G06F 3/06* (2006.01)
*G06F 13/42* (2006.01)

(52) U.S. Cl.
CPC .......... *G06F 3/0689* (2013.01); *G06F 3/0604* (2013.01); *G06F 3/0653* (2013.01); *G06F 13/4282* (2013.01)

(58) Field of Classification Search
None
See application file for complete search history.

(56) References Cited

U.S. PATENT DOCUMENTS

| 7,958,299 B2* | 6/2011 | Chien | G06F 11/3485 711/4 |
|---|---|---|---|
| 2006/0010288 A1* | 1/2006 | Marks | G06F 3/0605 711/114 |
| 2006/0101171 A1* | 5/2006 | Grieff | G06F 13/387 710/36 |
| 2007/0094472 A1* | 4/2007 | Marks | G06F 3/0607 711/170 |
| 2008/0195581 A1* | 8/2008 | Ashmore | G06F 3/0607 |
| 2012/0059991 A1* | 3/2012 | Cuddihy | G06F 3/0605 711/114 |
| 2012/0317357 A1* | 12/2012 | Kopylovitz | G06F 3/0607 711/114 |
| 2013/0212429 A1* | 8/2013 | Nakayama | G06F 11/1076 714/6.22 |
| 2015/0331894 A1* | 11/2015 | Barron | G06F 17/30864 707/622 |

* cited by examiner

*Primary Examiner* — Reginald G Bragdon
*Assistant Examiner* — Michael L Westbrook
(74) *Attorney, Agent, or Firm* — The Mueller Law Office, P.C.

(57) ABSTRACT

A method of determining a physical location of a hard drive includes the steps of: executing commands to obtain generic device names of expanders, addresses of hard drives connected to the expanders, slot numbers corresponding to the addresses, logical device names of the hard drives, the address of the hard drives; establishing correspondence information by using the address to link the generic device name of the expander to the logical device name of the hard drive connected to the expander, and to the slot number; and determining, according to the correspondence information, the generic device name of the expander to which a hard drive is connected and the slot number corresponding to the hard drive is installed, so as to locate the hard drive.

11 Claims, 4 Drawing Sheets

METHOD OF DETERMINING A PHYSICAL LOCATION OF A HARD DRIVE IN A CLUSTER STORAGE SYSTEM

CROSS-REFERENCE TO RELATED APPLICATION

This application claims priority of Taiwanese Patent Application No. 104143423, filed on Dec. 23, 2015.

FIELD

The disclosure relates to a method of determining a physical location of a hard drive, and more particularly to a method of determining a physical location associated with installation of a hard drive in a cluster storage system.

BACKGROUND

A conventional cluster storage system includes a computing device and at least one storage device connected to the computing device. The computing device is installed with Linux Operation System (OS) for controlling operations of the computing device and the storage device.

The storage device, for example, adopts an architecture of just a bunch of disks (JBOD), and includes a plurality of expanders each connected to a plurality of hard drives, and a plurality of slots for installation of the respective hard drives. In Linux OS, each of the hard drives corresponds to at least one logical device name. The storage device further includes a plurality of warning lights each corresponding to a respective one of the slots. When an abnormal hard drive among the hard drives is detected by firmware of the storage device, one of the warning lights corresponding to the slot installed with the abnormal hard drive is triggered to emit light, so as to notify a system administrator about which one of the slots the abnormal hard drive is installed. In this way, the system administrator is allowed to retrieve the abnormal hard drive from the storage device.

However, it is insufficient to rely on detecting the abnormal hard drive merely by the firmware itself in the storage device. Since the firmware of the storage device adopts relatively strict standard for determination of an abnormal hard drive, only the hard drive that is not able to operate would be determined as an abnormal hard drive by the firmware of the storage device.

Aside from detecting an abnormal hard drive by virtue of the firmware of the storage device, currently, the Linux OS installed in the computing device or a third-party computer program executed in the computing device may be utilized to determine whether the hard drives of the storage device have any abnormal condition other than abnormal conditions that are able to be detected by the firmware of the storage device. For example, the third-party computer program is executed to perform read/write test upon the hard drives, and to determine the hard drive which is unable to pass the read/write test as an abnormal hard drive. However, conventionally, when the aforementioned Linux OS or the third-party computer program detects an abnormal hard drive, only the logical device name corresponding to the abnormal hard drive thus detected is outputted. Since the system administrator is not able to recognize which physical slot the abnormal hard drive is installed in, the abnormal hard drive cannot be retrieved easily for maintenance or replacement.

SUMMARY

Therefore, an object of the disclosure is to provide a method of determining a physical location of a hard drive in a cluster storage system. The method can alleviate at least one of the drawbacks of the prior art.

According to the disclosure, the method is to determine a physical location of a hard drive in a cluster storage system which includes a computing device and a storage device connected to the computing device. The computing device is installed with an operating system (OS) which controls operations of the computing device and the storage device. The storage device includes a plurality of expanders, a plurality of hard drives each having at least one unique address, and a plurality of slots each configured for installation of a respective one of the hard drives and each corresponding to a slot number. Each of the expanders is connected to multiple ones of the hard drives, and corresponds to a generic device name in the OS. The expanders correspond to an identical logical device name in the OS. Each of the hard drives corresponds to at least one logical device name. The method is to be implemented by the computing device and includes the following steps of:

a) executing a first command associated with mapping between names and devices in the OS according to the identical logical device name of the expanders to obtain the generic device names of the expanders;

b) executing, for each of the expanders, a second command associated with a query about expander information in the OS according to a respective one of the generic device names of the expander to respectively obtain the addresses of the multiple ones of the hard drives connected to the expander and the slot numbers corresponding respectively to the addresses;

c) executing the first command to obtain the logical device names of the respective hard drives;

d) executing, for each of the hard drives, a third command associated with fetching data of a device in the OS according to the logical device name of the hard drive to obtain the address of the hard drive;

e) establishing correspondence information by using the address of each of the hard drives to link the generic device name of each of the expanders to the logical device name of each of the multiple ones of the hard drives connected to the expander, and to the slot number corresponding to the address of a respective one of the hard drives; and f) determining, according to the logical device name of a designated hard drive among the hard drives and the correspondence information established in step e), the generic device name of the expander to which the designated hard drive is connected and the slot number corresponding to the slot where the designated hard drive is installed, so as to physically locate the designated hard drive.

An effect of the disclosure resides in rapid determination of the generic device name of the expander to which the designated hard drive is connected and the slot number corresponding to the slot where the designated hard drive is installed according to the logical device name of the designated hard drive.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
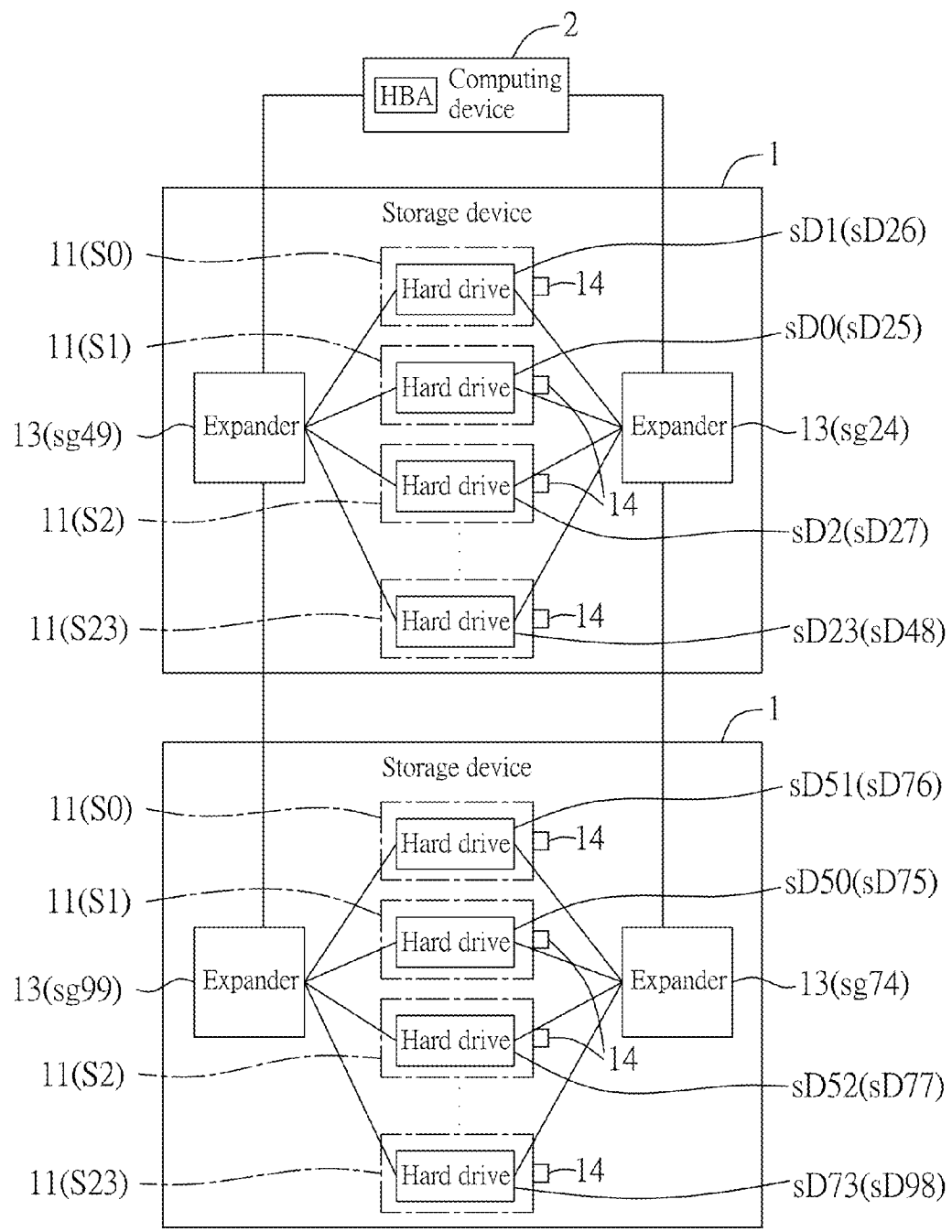
FIG. 1 is a block diagram illustrating an embodiment of a cluster storage system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a cluster storage system according to the disclosure is illustrated. The cluster storage system is configured to implement a method of determining a physical location of a hard drive in a cluster storage system according to the disclosure. The cluster storage system includes a computing device 2 and two storage devices 1 connected to the computing device 2. The computing device 2 is exemplified as a host computer in this disclosure, and is installed with Linux Operating System (OS) which controls operations of the computing device 2 and the storage devices 1.

In this embodiment, each of the storage devices 1 is just a bunch of disks (JBOD), and includes two expanders 13, twenty four hard drives, twenty four slots 11 each of which is configured for installation of a respective one of the hard drives and corresponds to a slot number, and twenty four warning lights 14 each of which corresponds to a respective one of the slots 11. Each of the hard drives has at least one unique address.

Each of the warning lights 14 which corresponds to a respective one of the slots 11 is configured to be controlled by one of the expanders 13 to which the disk drive installed in the slot 11 is connected. Moreover, each of the warning lights 14 is disposed and adjacent to a respective one of the slots 11, so that when one of the warning lights 14 is switched on, the warning light 14 is able to indicate a physical location of the slot 11 corresponding to the warning light 14.

Each of the expanders 13 in the Linux OS is connected to multiple ones of the hard drives and corresponds to a generic device name. The expanders 13 in the Linux OS correspond to an identical logical device name, e.g., "exp13". Specifically, the hard drives are exemplified as Serial Attached SCSI (SAS) hard drives in this embodiment. Therefore, each of the hard drives has two ports, is connected respectively to the two expanders 13 of the storage device 1, and therefore has two distinct addresses. In this embodiment, the addresses are SAS addresses, and the SAS addresses for the hard drives are distinct from one another. Moreover, each of the hard drives in the Linux OS corresponds to two generic device names and two logical device names. For example, referring to FIG. 1, the logical device names "sD24" and "sD26" correspond to a same one of the hard drives, and the logical device names "sD0" and "sD25" correspond to another same one of the hard drives. The generic device names of the expanders 13 are "sg24", "sg49", "sg74" and "sg99", respectively. However, in other embodiments, the hard drives may be exemplified as Serial ATA (SATA) hard drives each having only one port.

Furthermore, even though the slot numbers to which the slots 11 in the storage device 1 respectively correspond are usually numbered in sequence, the logical device names of the hard drives that are respectively installed in the slots do not necessarily correspond sequentially to the slot numbers. Therefore, it is unable to determine the slot number directly from the logical device name of the hard drive.

Referring once again to FIG. 1, the computing device 2 by virtue of a host bus adapter (HBA) is connected to the two expanders 13 of one of the storage devices 1 via Serial Attached Small Computer System Interface (SCSI). The two expanders 13 are connected respectively to the other two expanders 13 in the other one of the storage devices 1. However, it should be noted that connections between the computing device 2 and the storage devices 1, a total number of the storage devices 1, a total number of the expanders 13 and a total number of the hard drives 12 in one storage device 1 are not limited to the disclosure herein. The method of determining a physical location of a hard drive in a cluster storage system according to the disclosure is applicable to all kinds of Linux-based cluster storage system in the market.

Figure 2:
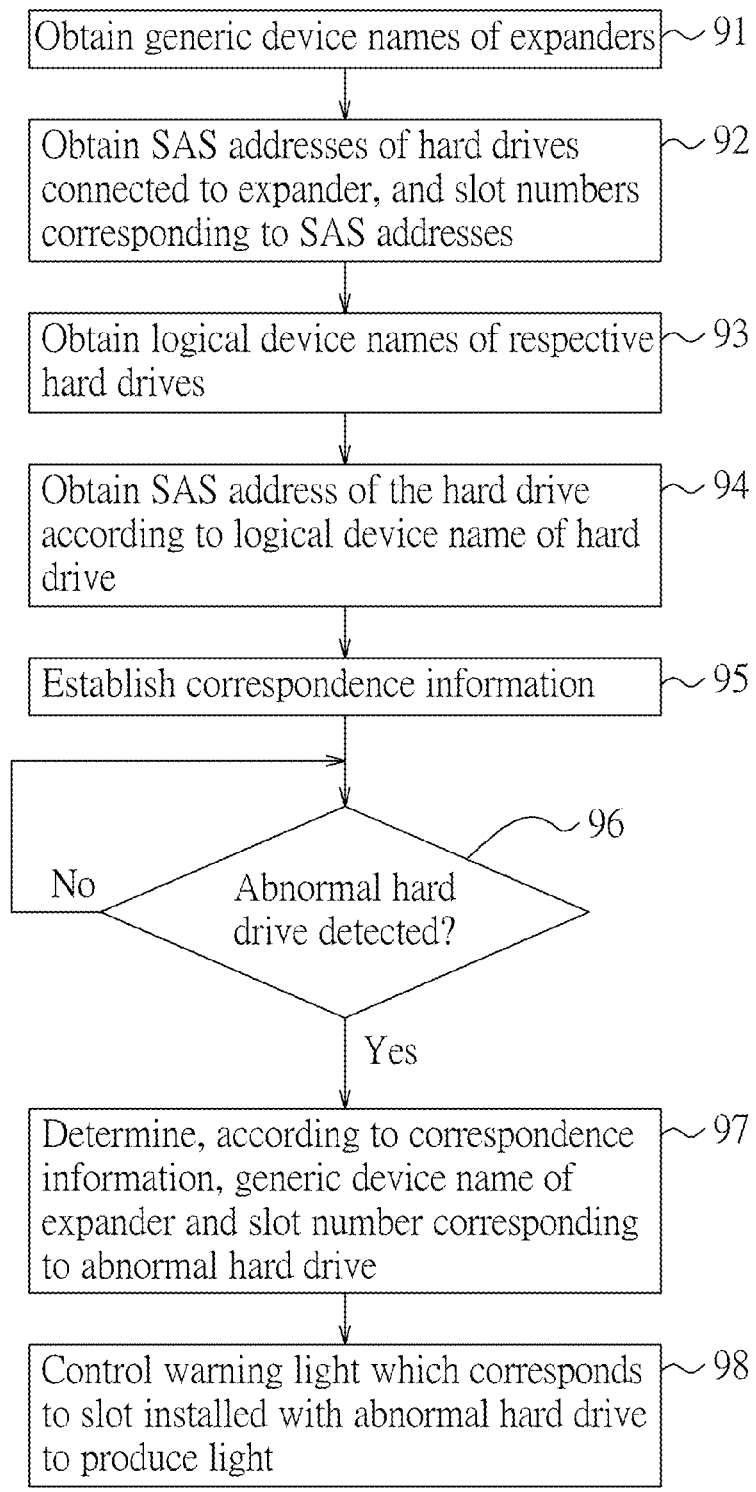
FIG. 2 is a flow chart illustrating a first embodiment of a method of determining a physical location of a hard drive in a cluster storage system according to the disclosure.

Referring to FIG. 2, detailed steps of a first embodiment of the method of determining a physical location of a hard drive in a cluster storage system according to the disclosure are explained hereinafter.

In step 91, the computing device 2 executes a first command associated with mapping between names and devices in the Linux OS according to the identical logical device name, "exp13", of the expanders 13 in the storage devices 1 to obtain the generic device names of the expanders, respectively. In this embodiment, the first command is sg_map, and the computing device 2, by executing "sg_map-xlawk '$6==13{print}'" in the Linux OS, is able to obtain the generic device names to which the expanders 13 respectively correspond as shown in Table 1 below. It should be noted that the generic device names and the logical device name shown in Table 1 are merely listed for explanation purposes in this disclosure, and are not necessarily utilized in practical Linux OS.

TABLE 1

| Generic device name of expander | Logical device name of expander |
|---|---|
| sg24 | exp13 |
| sg49 | exp13 |
| sg74 | exp13 |
| sg99 | exp13 |

In step 92, the computing device 2 executes, for each of the expanders 13, a second command associated with a query about expander information in the Linux OS according to a respective one of the generic device names of the expander 13 to respectively obtain the SAS addresses of the multiple ones of the hard drives connected to the expander 13 and the slot numbers corresponding respectively to the SAS addresses. In this embodiment, the second command is sg_ses. As shown in Table 2 below, the computing device 2, by executing "sg_ses-p 0x0a sg24" in the Linux OS, is able to obtain the SAS addresses of the hard drives connected to the expander 13 that has the generic device name of "sg24", and the slot numbers corresponding respectively to the SAS addresses. Similarly, by respectively executing "sg_ses-p 0x0a sg49", "sg_ses-p 0x0a sg74" and "sg_ses-p 0x0a sg99" in the Linux OS, the computing device 2 is able to obtain the SAS addresses of the hard drives connected to the expanders 13 that respectively have the generic device names of "sg49", "sg74" and "sg99", and the slot numbers corresponding respectively to the SAS addresses. Since each of the hard drives is connected to the two expanders 13 via the two ports, respectively in one storage device 1, ninety six SAS addresses of the hard drives are listed in Table 2, and each of the expanders 13 corresponds to twenty four SAS address of the hard drives. It should be noted that the generic device names, the SAS address of the hard drives and the slot numbers shown in Table 2 are merely listed for explanation purposes in this disclosure, and are not necessarily utilized in practical Linux OS.

TABLE 2

| Generic device name of expander | SAS address of hard drive connected to expander | Slot number corresponding to SAS address |
|---|---|---|
| sg24 | XX0 | S1 |
| sg24 | XX1 | S0 |
| sg24 | XX2 | S2 |
| ... | ... | ... |
| sg24 | XX23 | S23 |
| sg49 | XX24 | S1 |
| sg49 | XX25 | S0 |
| sg49 | XX26 | S2 |
| ... | ... | ... |
| sg49 | XX47 | S23 |
| sg74 | XX48 | S1 |
| sg74 | XX49 | S0 |
| sg74 | XX50 | S2 |
| ... | ... | ... |
| sg74 | XX71 | S23 |
| sg99 | XX72 | S1 |
| sg99 | XX73 | S0 |
| sg99 | XX74 | S2 |
| ... | ... | ... |
| sg99 | XX95 | S23 |

In step 93, the computing device 2 executes the first command to obtain the logical device names of the respective hard drives. In this embodiment, the computing device 2, by executing "sg_map-x" in the Linux OS, is able to obtain the logical device names and the generic device names of the respective hard drives as shown in Table 3 below. Since each of the hard drives is connected to the two expanders 13 via the two ports respectively, each of the hard drives corresponds to two generic device names and two logical device names. For example, referring once again to FIG. 1, the hard drive corresponding to the logical device name of "sD0" and the hard drive corresponding to the logical device name of "sD25" are in fact the same hard drive. The hard drive corresponding to the logical device name of "sD1" and the hard drive corresponding to the logical device name of "sD26" are in fact the same hard drive. Moreover, it should be noted that the generic device names and the logical device names shown in Table 2 are merely listed for explanation purposes in this disclosure, and are not necessarily utilized in practical Linux OS.

TABLE 3

| Generic device name of hard drive | Logical device name of hard drive |
|---|---|
| sg0 | sD0 |
| sg1 | sD1 |

TABLE 3-continued

| Generic device name of hard drive | Logical device name of hard drive |
|---|---|
| sg2 | sD2 |
| ... | ... |
| sg23 | sD23 |
| sg25 | sD25 |
| sg26 | sD26 |
| sg27 | sD27 |
| ... | ... |
| sg48 | sD48 |
| sg50 | sD50 |
| sg51 | sD51 |
| sg52 | sD52 |
| ... | ... |
| sg73 | sD73 |
| sg75 | sD75 |
| sg76 | sD76 |
| sg77 | sD77 |
| ... | ... |
| sg98 | sD98 |

In step 94, the computing device 2 executes, for each of the hard drives, a third command associated with fetching data of a device in the Linux OS according to the logical device name of the hard drive to obtain the SAS address of the hard drive. For example, the third command is associated with fetching a Vital Product Data (VPD) of a SCSI device, such as a disk or an ATA Packet Interface (ATAPI) DVD, in the cluster storage system. In this embodiment, the third command is sg_vpd. As shown in Table 4 below, by executing "sg_vpd -p di_port-q sD0" in the Linux OS, the computing device is able to obtain the SAS address of the hard drive corresponding to the logical device name of "sD0". Similarly, by repeatedly executing sg_vpd, the computing device 2 is able to obtain the SAS addresses of the hard drives corresponding to other logical device names.

TABLE 4

| Logical device name of hard drive | SAS address of hard drive |
|---|---|
| sD0 | XX0 |
| sD1 | XX1 |
| sD2 | XX2 |
| ... | ... |
| sD23 | XX23 |
| sD25 | XX24 |
| sD26 | XX25 |
| sD27 | XX26 |
| ... | ... |
| sD48 | XX47 |
| sD50 | XX48 |
| sD51 | XX49 |
| sD52 | XX50 |
| ... | ... |
| sD73 | XX71 |
| sD75 | XX72 |
| sD76 | XX73 |
| sD77 | XX74 |
| ... | ... |
| sD98 | XX95 |

In step 95, the computing device 2 establishes correspondence information, such as information shown in Table 5, by using the SAS address of each of the hard drives to link the generic device name of each of the expanders 13 to the logical device name of each of the multiple ones of the hard drives connected to the expander 13, and to the slot number corresponding to the SAS address of a respective one of the hard drives. In other words, the computing device 2, by using the SAS address of each of the hard drives as a linking element, integrates Table 2 and Table 4 so as to result in the correspondence information of Table 5. In this embodiment, the correspondence information contains the generic device name of each of the expanders 13, the logical device name of each of the multiple ones of the hard drives connected to the expander 13, the SAS address of each of the hard drives, and the slot number corresponding to the SAS address of a respective one of the hard drives. It is evident from FIG. 1 in combination with Table 5 that since the logical device names "sD0" and "sD25" correspond to the same hard drive, these two logical device names should correspond to the same slot number "S1", since the logical device names "sD1" and "sD26" correspond to the same hard drive, these two logical device names should correspond to the same slot number "S0", and so forth.

TABLE 5

| Generic device name of expander | Logical device name of hard drive | SAS address of hard drive connected to expander | Slot number corresponding to SAS address of hard drive |
|---|---|---|---|
| sg24 | sD0 | XX0 | S1 |
| sg24 | sD1 | XX1 | S0 |
| sg24 | sD2 | XX2 | S2 |
| ... | ... | ... | ... |
| sg24 | sD23 | XX23 | S23 |
| sg49 | sD25 | XX24 | S1 |
| sg49 | sD26 | XX25 | S0 |
| sg49 | sD27 | XX26 | S2 |
| ... | ... | ... | ... |
| sg49 | sD48 | XX47 | S23 |
| sg74 | sD50 | XX48 | S1 |
| sg74 | sD51 | XX49 | S0 |
| sg74 | sD52 | XX50 | S2 |
| ... | ... | ... | ... |
| sg74 | sD73 | XX71 | S23 |
| sg99 | sD75 | XX72 | S1 |
| sg99 | sD76 | XX73 | S0 |
| sg99 | sD77 | XX74 | S2 |
| ... | ... | ... | ... |
| sg99 | sD98 | XX95 | S23 |

In step 96, the computing device 2 executes a testing program to determine whether at least one of the hard drives satisfies a preset abnormal condition. The abnormal condition may be exemplified as read/write errors for at least one of the two logical device names of one hard drive. The computing device 2 determines said at least one of the hard drives as an abnormal hard drive when determining that said at least one of the hard drives satisfies the preset abnormal condition.

In step 97, the computing device 2 determines, according to the logical device name of a designated hard drive among the hard drives and the correspondence information established in step 95, the generic device name of the expander 13 to which the designated hard drive is connected and the slot number corresponding to the slot where the designated hard drive is installed, so as to physically locate the designated hard drive. In this embodiment, the abnormal hard drive determined in step 96 serves as the designated hard drive, and physical location of the abnormal hard drive is determined. For example, as shown in Table 5, when detecting occurrence of errors in the hard drive (i.e., the abnormal hard drive) which corresponds to the logical device name of "sD0", the computing device 2 by looking up the correspondence information of Table 5 is able to promptly determines that the generic device name of the expander 13 to which the abnormal hard disk is connected is "sg24", and the slot number corresponding to the abnormal hard drive is "S1".

In step 98, the computing device 2 controls the storage device 1 to generate a notification output which is associated with the generic device name of the one of the expanders 13 to which the designated hard drive is connected, and with the slot number corresponding to the designated hard drive. Specifically, the computing device 2 executes a fourth command associated with sending a command to a device in the Linux OS according to the generic device name of the one of the expanders 13 to which the designated hard drive is connected and according to the slot number corresponding to the designated hard drive, so as to enable the expander 13 which is connected to the designated hard drive to control the warning light 14 which corresponds to the slot 11 installed with the designated hard drive to produce light to serve as the notification output. For example, the fourth command is associated with sending a SCSI SEND DIAGNOSTIC command to a SCSI device, such as a SCSI disk or a DVD drive, in the cluster storage system. In this embodiment, the fourth command is sg_senddiag. According to the aforementioned example and referring to FIG. 1, when detecting occurrence of errors in the hard drive corresponding to the logical device name of "sD0", the computing device 2, by executing "sg_senddiag--pf-r 2,0,0, 0c, 0,0,0, 0,0,0,0,0,80,0,0,20 sg24 S1" in the Linux OS, is able to enable the expander 13 which corresponds to the generic device name of "sg24" to control the warning light 14 which corresponds to the slot 11 of "S1" installed with the designated hard drive corresponding to the logical device name of "sD0" to produce light, so as to indicate the physical location of the hard drive.

Moreover, in another embodiment, when the storage devices 1 are not provided with the warning lights 14 and step 98 is not performed, the method of determining a physical location of a hard drive in a cluster storage system according to the disclosure is still effective. For example, a system administrator may record in advance which one of the storage devices 1 each of the expanders 13 belongs to, and record a position of each of the slots 11 corresponding to the expander 13. In this way, when an abnormal hard drive is detected by the computing device 2, the computing device 2, by looking up the correspondence information of Table 5, is able to obtain the generic device name of the expander 13 to which the abnormal hard drive is connected, and the slot number corresponding to the abnormal hard drive. In this way, the system administrator is allowed to rapidly determine the physical position where the abnormal hard drive is installed based on position information of the expander 13 and the slot 11 previously recorded by the system administrator.

Figure 3:
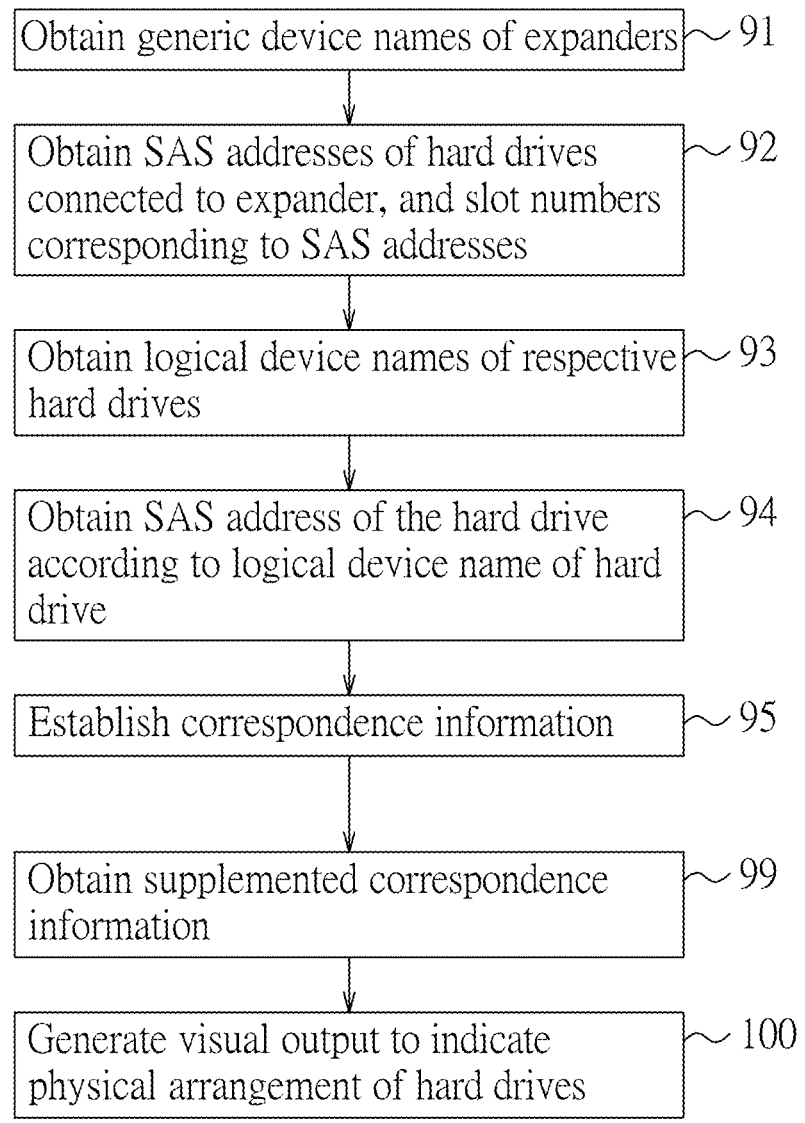
FIG. 3 is a flow chart illustrating a second embodiment of the method of determining a physical location of a hard drive in a cluster storage system according to the disclosure.

Referring to FIG. 3, a second embodiment of the method of determining a physical location of a hard drive in a cluster storage system according to the disclosure is illustrated. The second embodiment is similar to the first embodiment illustrated in FIG. 2, and differences therebetween resides in steps subsequent to step 95.

Figure 4:
FIG. 4 is a schematic view illustrating a visual output to indicate a physical arrangement of hard drives with presentation of corresponding slot numbers.
Figure 5:
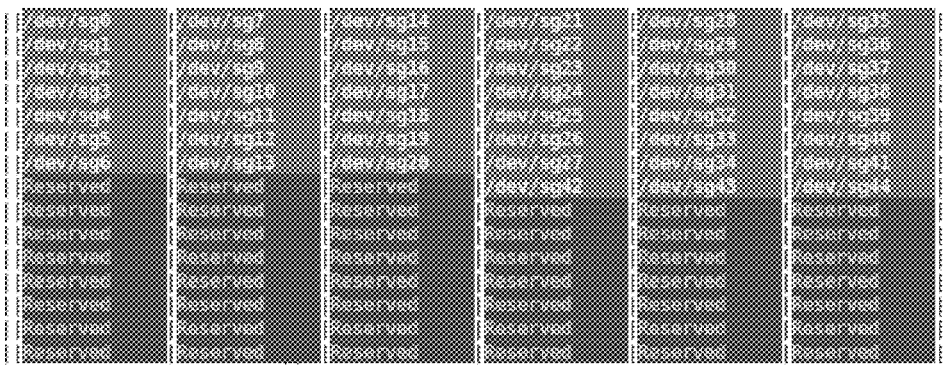
FIG. 5 is a schematic view illustrating a visual output to indicate the physical arrangement of the hard drives with presentation of corresponding generic device names.
Figure 6:
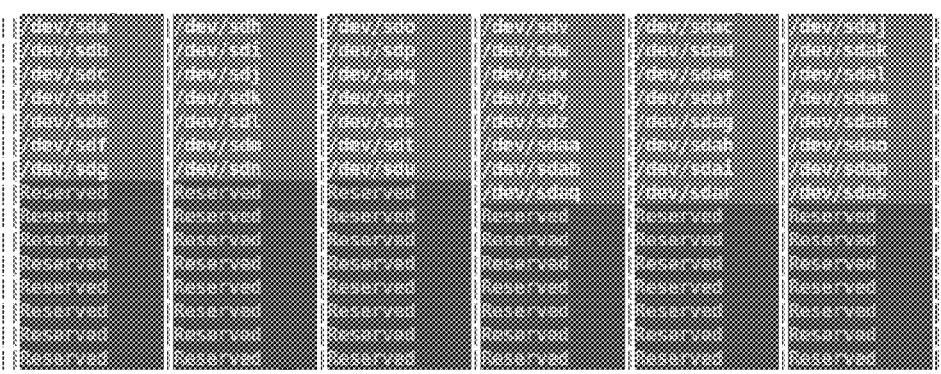
FIG. 6 is a schematic view illustrating a visual output to indicate the physical arrangement of the hard drives with presentation of corresponding logical device numbers.

Subsequent to step 95, in step 99, the computing device 2 links a predefined display index of each of the hard drives to at least one of the slot number corresponding to the hard drive, to the generic device name of the hard drive, or to the logical device name of the hard drive to obtain supplemented correspondence information. The predetermined display index is associated with a position of a corresponding one of the hard drives in a physical arrangement of the hard drives in the storage device. The predefined display index of each of the hard drives in this embodiment is in a form of a number. For example, referring to FIG. 4 to FIG. 6, the physical arrangement of the hard drives in the storage device is illustrated. The hard drive in the first row and the first column corresponds to the display index of "1", the hard drive in the second row and the first column corresponds to the display index of "2", and so forth. In a variation of the second embodiment, the predefined display index of each of the hard drives is in a form of coordinates. For example, the hard drive in the first row and the first column corresponds to the display index of (1,1), the hard drive in the second row and the first column corresponds to the display index of (2,1), and so forth. It should be noted that the physical arrangement of the hard drives exemplified in FIG. 4 to FIG. 6 are distinct from those of the hard drives as shown in FIG. 1, and naming of the slot numbers, generic device names and logical device names are tweaked for the sake of clearer explanation of the second embodiment.

In step 100, the computing device 2 according to the supplemented correspondence information generates a visual output to indicate the physical arrangement of the hard drives with presentation of at least one of the corresponding slot numbers, the corresponding generic device names or the corresponding logical device names. The visual output may be tables as shown in FIG. 4 to FIG. 6 to be displayed on a display of the computing device 2. For example, in FIG. 4, the physical arrangement of the hard drives is displayed with presentation of the corresponding slot numbers. In FIG. 5, the physical arrangement of the hard drives is displayed with presentation of the corresponding generic device names. In FIG. 6, the physical arrangement of the hard drives is displayed with presentation of the corresponding logical device names. In this way, by performing the aforementioned steps of the second embodiment, the visual output which indicates the physical arrangement of the hard drives is generated, and by viewing the visual output, the system administrator may clearly and rapidly identify a physical location of a desired one of the hard drives. In other words, mapping between physical locations of hard drives and virtual information of the hard drives, such as slot numbers of slots where the hard drives are installed, logical device names of the hard drives and generic device names of the hard drives, may be established for allowing more efficient monitoring and maintenance of hard drives in a cluster storage system.

Moreover, after the supplemented correspondence information is obtained in step 99, when an abnormal hard drive is detected (such as the abnormal hard drive detected in the determination made in step 96 of the first embodiment), the computing device 2 further determines, based on the supplemented correspondence information, the display index corresponding to the abnormal hard drive, so as to generate a visual output with the physical location of the abnormal hard drive clearly indicated in the visual output. For example, when it is determined that the display index corresponding to the abnormal hard drive is (1, 1), the hard drive in the first row and the first column in the visual output is presented in a different color or with a shining effect, such that the system administrator may be informed of the physical location of the abnormal hard drive with ease.

To sum up, in the method of determining a physical location of a hard drive in a cluster storage system according to the disclosure, by integrating information obtained through execution of Linux commands, such as sg_map, seg_ses and sg_vpd, the correspondence information of Table 5 associated with hard drives can be established. In this way, when detecting occurrence of errors in one of the hard drives (i.e., an abnormal hard drive), the generic device name the expander to which the abnormal hard drive is connected and the slot number corresponding to the abnormal hard drive may be promptly determined according to the logical device name of the correspondence information, so as to physical locate the abnormal hard drive with ease.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of determining a physical location of a hard drive in a cluster storage system which includes a computing device and a storage device connected to the computing device, the computing device being installed with an operating system (OS) which controls operations of the computing device and the storage device, the storage device including a plurality of expanders, a plurality of hard drives each having at least one unique address, and a plurality of slots each configured for installation of a respective one of the hard drives and each corresponding to a slot number, each of the expanders connected to multiple ones of the hard drives, and corresponds to a generic device name in the OS, the expanders corresponding to an identical logical device name in the OS, each of the hard drives corresponding to at least one logical device name, the method to be implemented by the computing device and comprising the following steps of:

a) executing a first command associated with mapping between names and devices in the OS according to the identical logical device name of the expanders to obtain the generic device names of the expanders;

b) executing, for each of the expanders, a second command associated with a query about expander information in the OS according to a respective one of the generic device names of the expander to respectively obtain the addresses of the multiple ones of the hard drives connected to the expander and the slot numbers corresponding respectively to the addresses;

c) executing the first command to obtain the logical device names of the respective hard drives;

d) executing, for each of the hard drives, a third command associated with fetching data of a device in the OS according to the logical device name of the hard drive to obtain the address of the hard drive;

e) establishing correspondence information by using the address of each of the hard drives to link the generic device name of each of the expanders to the logical device name of each of the multiple ones of the hard drives connected to the expander, and to the slot number corresponding to the address of a respective one of the hard drives; and f) determining, according to the logical device name of a designated hard drive among the hard drives and the correspondence information established in step e), the generic device name of the expander to which the designated hard drive is connected and the slot number corresponding to the slot where the designated hard drive is installed, so as to physically locate the designated hard drive.

2. The method of claim 1, wherein in step f), when an abnormal hard drive among the hard drives is detected, the abnormal hard drive serves as the designated hard drive, and physical location of the abnormal hard disk is determined.

3. The method of claim 2, wherein step f) includes executing a testing program to determine whether at least one of the hard drives satisfies a preset abnormal condition, and determining said at least one of the hard drives as the abnormal hard drive when determining that said at least one of the hard drives satisfies the preset abnormal condition.

4. The method of claim 1, wherein in step a), the OS is Linux and the first command is sg_map, in step b) the second command is seg_ses, and in step d) the third command is sg_vpd.

5. The method of claim 1, subsequent to step f), further comprising the step of:
   g) controlling the storage device to generate a notification output which is associated with the generic device name of the one of the expanders to which the designated hard drive is connected, and with the slot number corresponding to the designated hard drive.

6. The method of claim 5, the storage device further including a plurality of warning lights corresponding respectively to the slots, each of the warning lights which corresponds to a respective one of the slots being configured to be controlled by one of the expanders to which the disk drive installed in the slot is connected,
   wherein step g) includes executing a fourth command associated with sending a command to a device in the OS according to the generic device name of the one of the expanders to which the designated hard drive is connected and according to the slot number corresponding to the designated hard drive, so as to enable the expander which is connected to the designated hard drive to control the warning light which corresponds to the slot installed with the designated hard drive to produce light to serve as the notification output.

7. The method of claim 6, wherein in step g), the fourth command is sg_senddiag.

8. The method of claim 1, wherein the address of each of the hard drives is a Serial Attached SCSI (SAS) address.

9. The method of claim 1, subsequent to step e), further comprising the following steps of:
   h) linking a predefined display index of each of the hard drives to at least one of the slot number corresponding to the hard drive, to the generic device name of the hard drive, or to the logical device name of the hard drive to obtain supplemented correspondence information, the predefined display index being associated with a position of a corresponding one of the hard drives in a physical arrangement of the hard drives in the storage device; and
   i) generating, according to the supplemented correspondence information, a visual output to indicate the physical arrangement of the hard drives with presentation of at least one of the corresponding slot numbers, the corresponding generic device names or the corresponding logical device names.

10. The method of claim 9, wherein in step h), the predefined display index of each of the hard drives is in a form of one of a number and coordinates.

11. The method of claim 9, subsequent to step h), further comprising the step of:
   when an abnormal hard drive is detected, determining, based on the supplemented correspondence information, the display index corresponding to the abnormal hard drive; and
   generating, according to the display index corresponding to the abnormal hard drive, a visual output with the physical location of the abnormal hard drive indicated in the visual output.

* * * * *